Sept. 24, 1968　　　　　　J. J. MARTIN　　　　　　3,402,943
CHASSIS COUPLING ARRANGEMENT
Filed May 19, 1966　　　　　　　　　　　　　　6 Sheets-Sheet 3
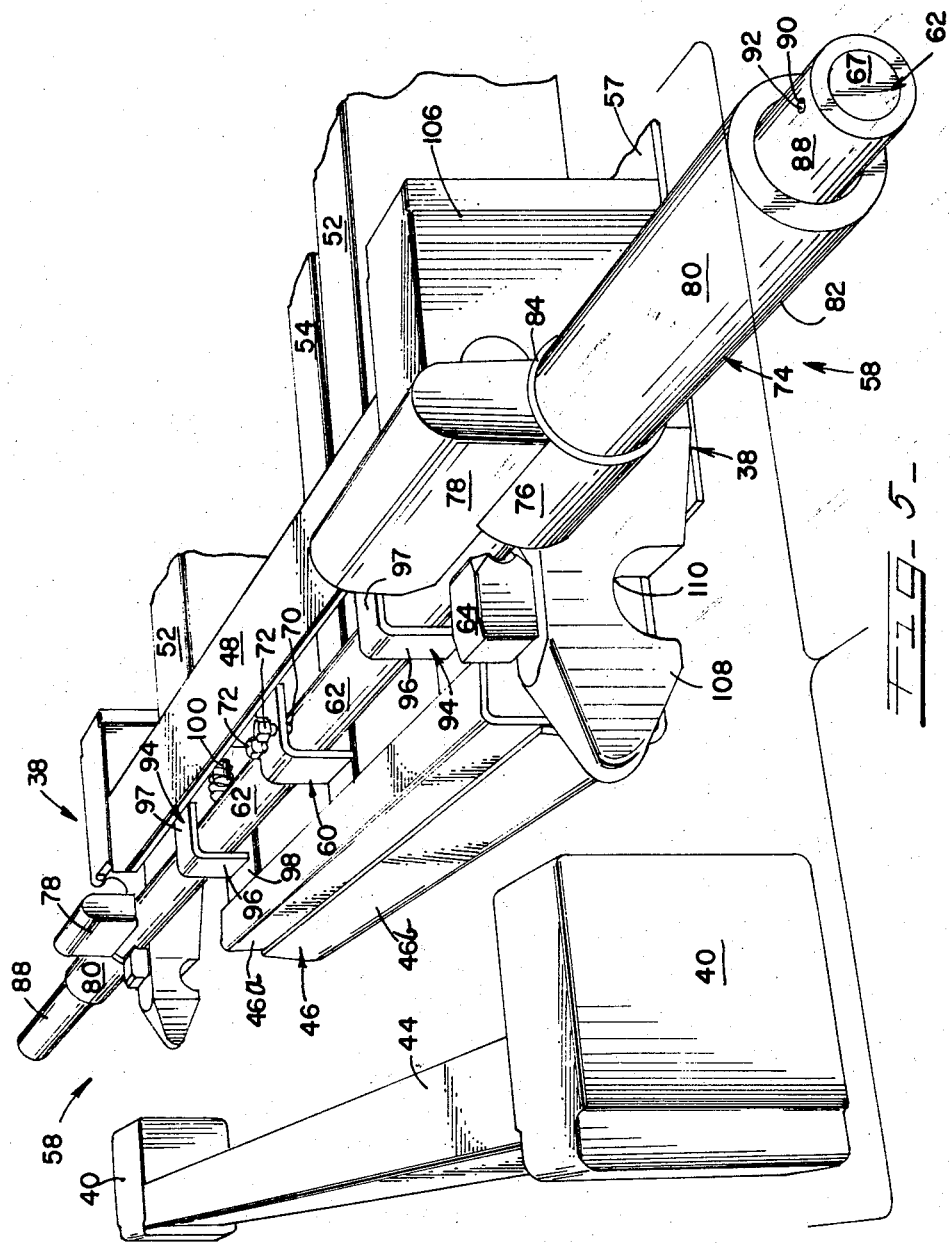
INVENTOR
JOHN J. MARTIN
BY Richard J. Myers
ATT'Y.

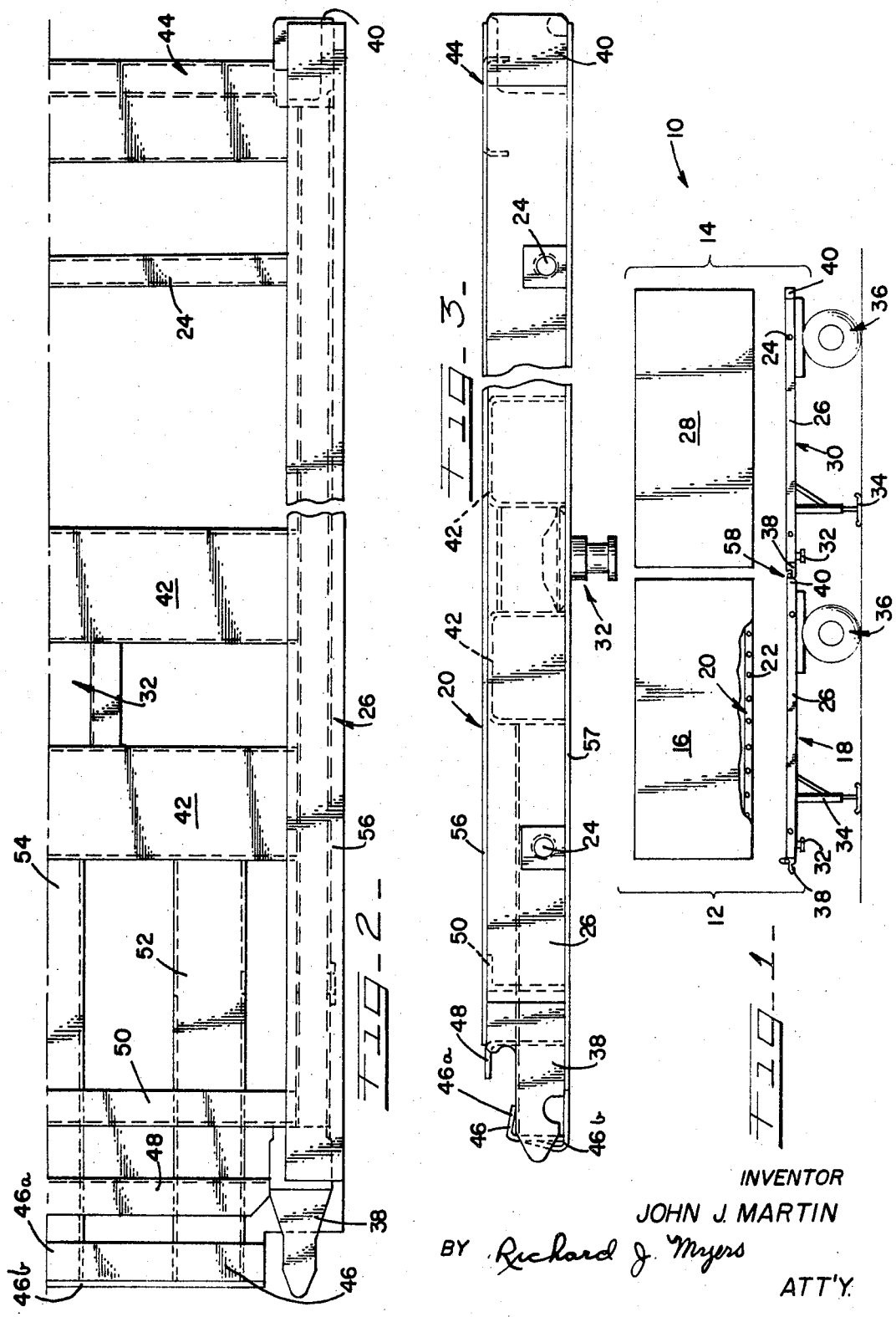

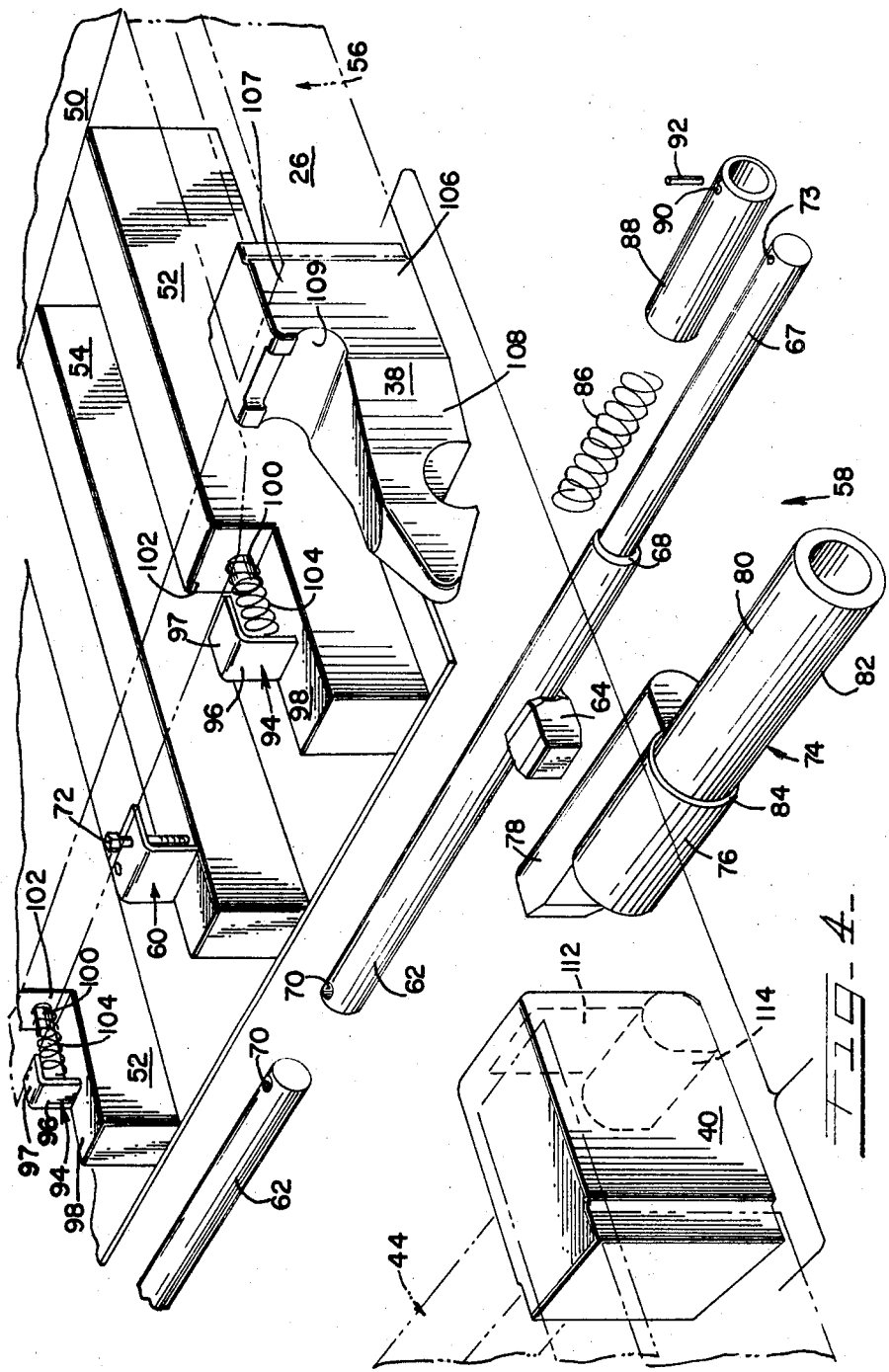

Sept. 24, 1968 J. J. MARTIN 3,402,943
CHASSIS COUPLING ARRANGEMENT
Filed May 19, 1966 6 Sheets-Sheet 4
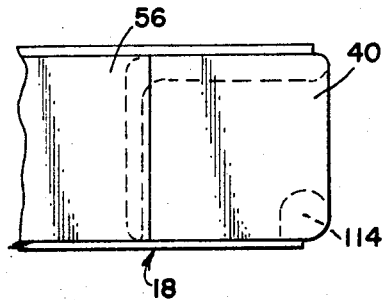
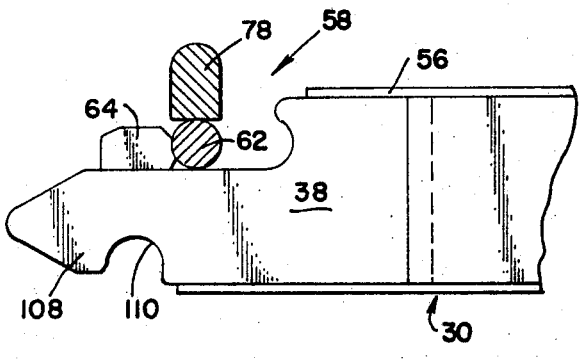
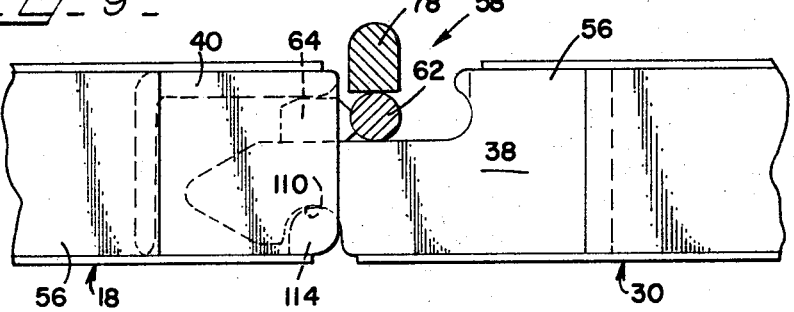
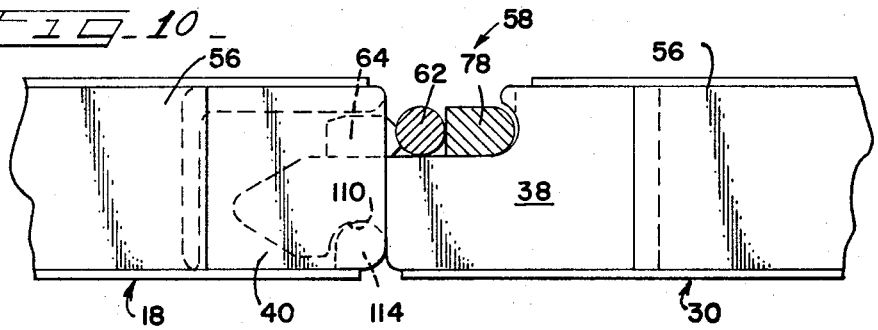
INVENTOR
JOHN J. MARTIN
BY Richard J. Myers
ATT'Y

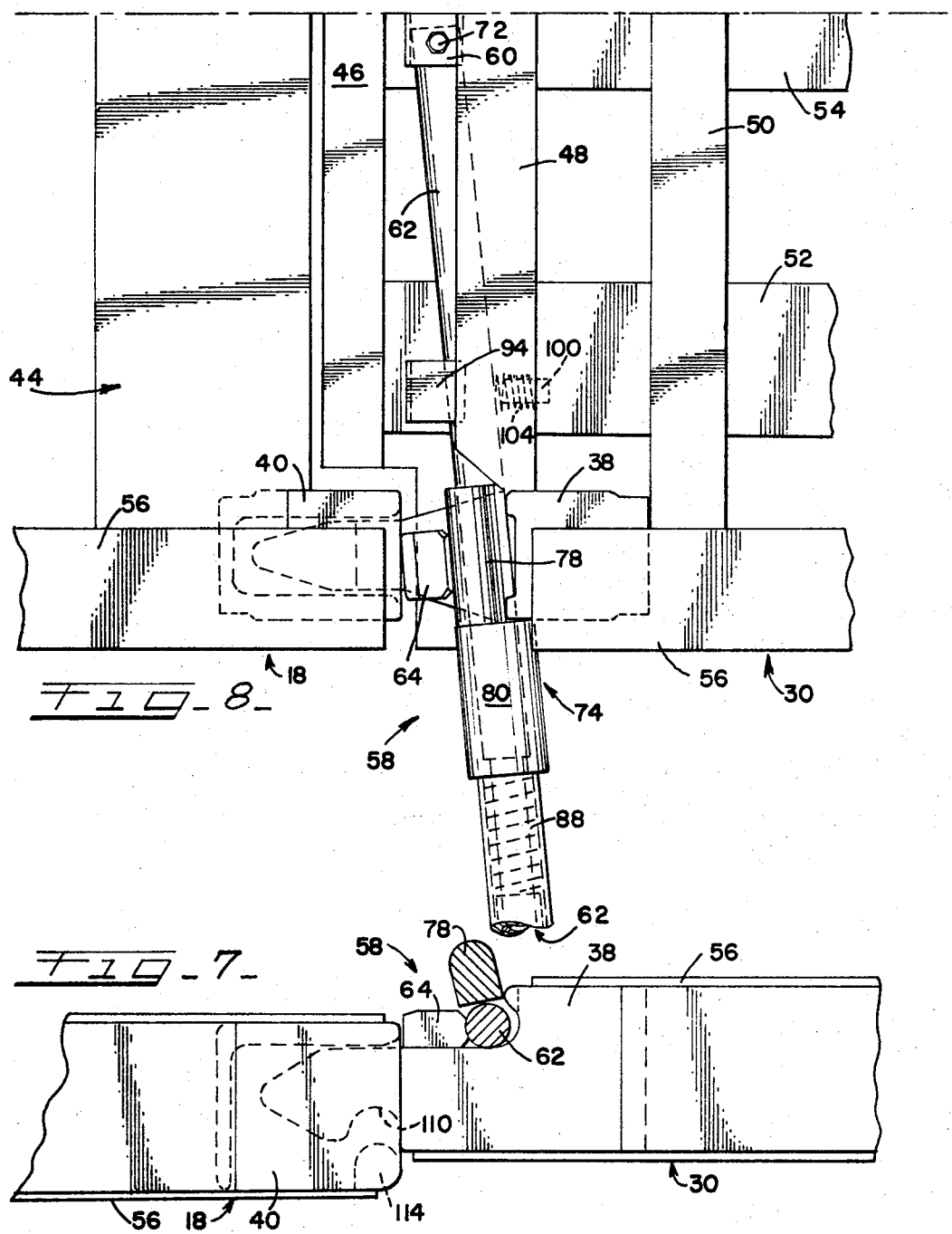

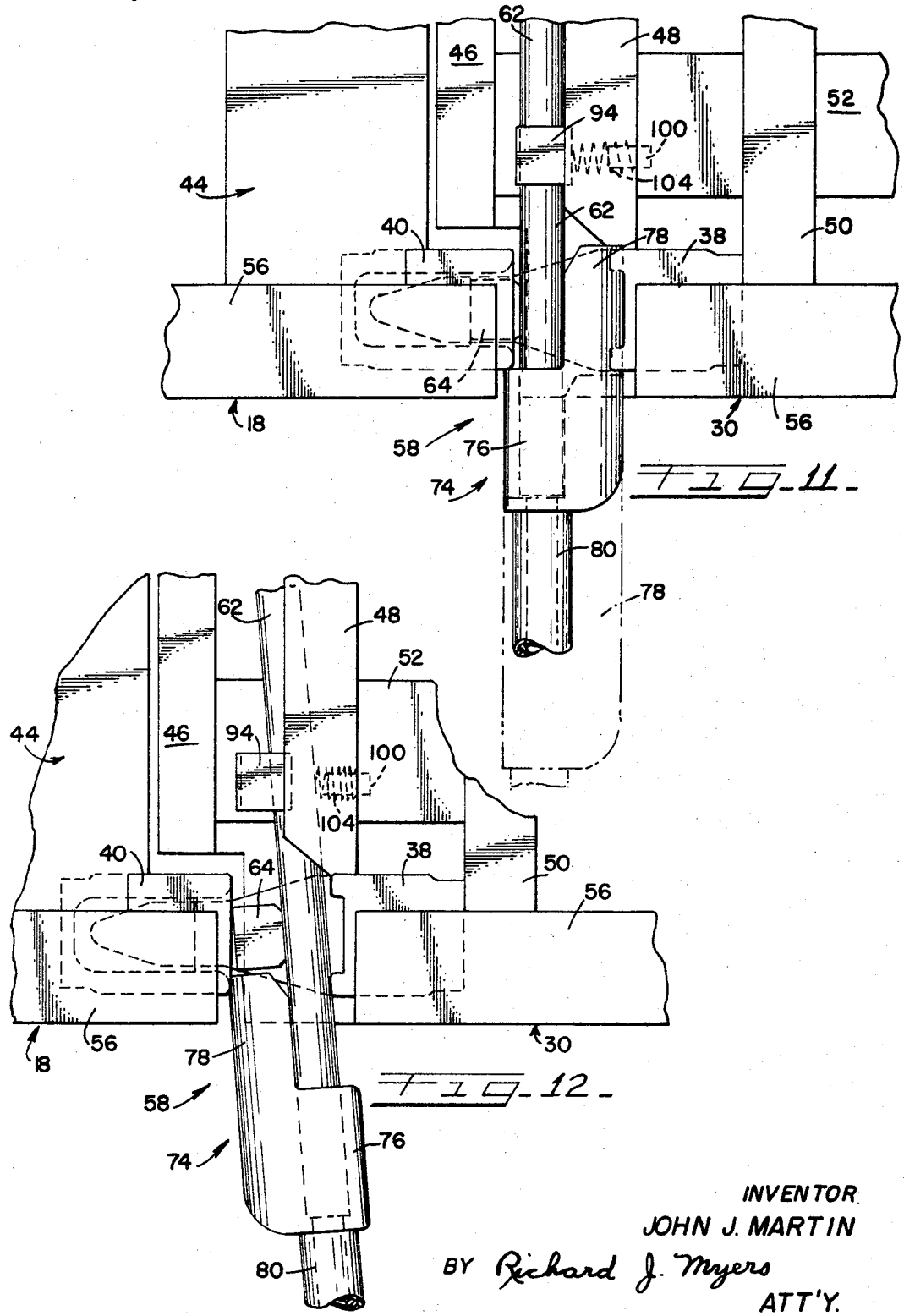

United States Patent Office 3,402,943
Patented Sept. 24, 1968

3,402,943
CHASSIS COUPLING ARRANGEMENT
John J. Martin, Weatherly, Pa., assignor to Pullman Incorporated, Chicago, Ill., a corporation of Delaware
Filed May 19, 1966, Ser. No. 551,271
10 Claims. (Cl. 280—415)

ABSTRACT OF THE DISCLOSURE

A chassis coupling arrangement for a pair of tandem semi-trailer chassis comprising, a coupler means for one chassis, a coupler receiving means for the other chassis, means for interlocking the coupler means and the coupler receiving means comprising a handle and lock assembly having a handle means adapted for pivotal attachment to one chassis and lock means axially and rotatably movable on the handle means, latch means on the handle means receivable with the coupler receiving means and means on the lock means receivable with the coupler means and co-operative therewith for retaining the latch means with the coupler receiving means for interlocking the coupler means and the coupler receiving means, and means for coupling and uncoupling the coupler means and the coupler receiving means comprising biasing means adapted for attachment to one of the chassis for urging handle means to the locked position, and further biasing means on the handle means urging the lock means to a locked position.

---

This invention relates to a chassis coupling arrangement and in particular to a coupling arrangement for connecting a pair of semi-trailer chassis in tandem relation.

In over the highway operation for transferring of containers from one trailer to another or between the railroad car and the trailer or between the trailer and the air freight carrier it may be desirable to couple several trailer chassis together during transportation. For instance, it may be desirable to hook up a pair of trailers with the lead trailer pulled by a tractor, sliding the forward bogie of the following trailer toward the rear bogie of the following trailer and thus allowing the tractor bogie to support the forward end of the leading trailer with a pair of bogies located at the rear of the following trailer. Such an arrangement may be accomplished when the rear of the leading trailer chassis is coupled to the front of the following trailer chassis.

It is therefore a general object of this invention to provide for means for coupling together a pair of trailer chassis for over the highway travel.

Another object of this invention is to provide for a novel coupling arrangement between tandem chassis whereby the chassis are uniquely locked to one another through the manipulation of a novel chassis intercoupler assembly.

A further object of this invention is to provide for a novel chassis coupling arrangement for tandem semi-trailer chassis whereby the operator may employ a novel handle and lock assembly to insure positive locking engagement between the couplers and coupler pockets of the respective chassis.

Still another object of this invention is to provide for a novel system of coupling together a pair of trailer chassis whereby a pair of trailers may be transported over the highway in tandem relation and uncoupled from one another as desired.

These and other objects will become more apparent from reference to the following description, accompanying drawings, and appended claims, to wit:

FIG. 1 is illustrative of a pair of tandem coupled chassis for carrying an associated pair of containers or cargo van bodies over the highway;

FIG. 2 is a partial plan view of the couplable chassis assembly;

FIG. 3 is a partial side elevational view of the couplable chassis assembly;

FIG. 4 is a perspective view of the forward and rear portions of a couplable chassis assembly means and an exploded view showing of the novel handle and lock assembly;

FIG. 5 is a view similar to FIG. 4 but with the handle and lock assembly positioned on one of the chassis; and FIGS. 6 through 12 are illustrative of the various positions and steps performed in coupling and uncoupling of the chassis.

With reference to the drawings, and in particular with reference to FIG. 1, there is depicted in diagrammatic exploded view manner a pair of intercoupled chassis for carrying a pair of containers to form a pair of intercoupled semi-trailer units 10, the leading unit 12 being pulled by a tractor (not shown) with the following trailer unit 14 coupled thereto. The leading container or cargo van body 16 is coupled to the leading trailer chassis 18 by the standard pin or latch means (not shown) extending through the rail openings 20 of the rail 22 and through the chassis rail openings 24 of the chassis rail means 26 in the conventional manner. The rear container or cargo body 28 is similarly connected to the rear trailer chassis 30. Each chassis 18 or 30 is provided with the standard king pin assembly 32, the raisible landing gear 34, and the rear slidable bogie suspension 36 including wheels therefor. Each chassis unit at its forward end is provided with a coupler 38 and at its rear end with a coupler pocket 40, whereby the leading chassis unit 18 is coupled to the following chassis unit 30.

The general construction of the chassis unit 18 or 30 is more specifically shown in FIGS. 2 and 3, where it is seen that a chassis unit 20, for example, comprises a plurality of U-shaped cross members 42, king pin assembly 32, longitudinally extending container coupling rail means 26, chassis container coupling aperture means 24, rear cross member structure 44, and forward cross means 46 formed by a pair of angle members 46a and 46b and cross members 48 and 50, and front longitudinally extending U-shaped support members 52 and 54, and top plate 56 and bottom plate 57, the forward coupler unit 38 being connected with the cross member 50 and the rear coupler pocket unit 40 being connected with the rear coupler structure 44, all of these forming the structural elements for the chassis unit 18 or 30.

In FIGS. 4 and 5 there is depicted the novel handle and locking means 58 which is pivotally connected to the lock pivot bracket 60 mounted on the chassis channel member 54. In FIG. 4 the handle and locking means 58 for locking the coupler and coupler pocket units 38 and 40 is separated into its individual components and comprises a handle unit 62, which is an elongated rod-like member, having a latch 64 attached thereto on its larger diameter 66 connecting with a smaller diameter portion 67 defining a shoulder 68 therebetween. The end of the large diameter portion 66 has an aperture 70 for receiving pivot pin 72 for coupling the handle 62 to the lock pivot bracket 60 and the smaller diameter portion 67 is provided with a retainer locking pin aperture 73. The handle and lock assembly 58 further comprises a lock assembly or unit 74 which has a large diameter or rod like portion 76 upon which is integrally mounted a rounded elongated lug 78 and has a reduced diameter or round shaped extension portion 80 forming a continuous tubular element 82 with the portion 76 having a shoulder 84. The handle and lock assembly 58 also comprises a handle and lock elongated spring 86 and a round tubular retainer element 88. The tubular retainer element 88 has an aperture 90 and a pin 92 is inserted through the aperture 90 and the aperture 73 for locking the retainer element 88 to the extension 67 of the handle 62. The lock assembly 74 slips over the thinnest portion 67 of the handle 62 until the lock assembly 74 is stopped by the shoulder 68 of the large diameter portion 64 of the handle 62, as shown in FIG. 5. The handle and lock assembly spring 86 is then slid over the thinner portion 67 of the handle 62 and is inserted down into the extension 80 of the lock assembly 74. The driver or operator uses this extension 80 as a handle to move the lock assembly 74 and the handle assembly 62 into various positions to be described for the operation of the coupler 38. The retainer 88 is then slid onto the thinner portion 67 of the handle 62 and held in place with the groove pin 92 when inserted through the openings 90 and 73 compressing the spring 86 between the retainer element 88 and an internal shoulder of the lock assembly 74 to move the assembly 74 against the shoulder 68.

There are two such handle and lock assemblies 58 mounted on the forward end of the chassis 18 or 30 as shown in FIG. 5 and they straddle their respective members 52 and member 54. Each member 52 for a respective handle and lock assembly 58 mounts a respective L-shaped stop element 94 having its vertical portion 96 attached to the horizontal surface 98 of member 52 and its horizontal part 97 disposed over a respective handle 62 while a spring retainer or lug 100 is mounted to the vertical surface 102 of member 52 and carries a stop spring 104 which urges a respective handle 62 against the inside surface of portion 96 of the stop element 94 to hold the handle flush against the stop element and at right angles to the longitudinal axis of the chassis 18 or 30.

The chassis 18 or 30 at its forward end has a pair of couplers 38, 38 and as seen in FIGS. 4 and 5 each coupler comprises an enlarged rear part 106 having a raised portion 107 having a vertical recess portion 109 to receive the curved portion of lug 78 during the coupler locking operation and a forward nose or hook part 108 which is tapered and has an undercut slot or recess 110 for reception within aperture or pocket portion 112 of one of a pair of coupler pocket members 40, 40 on the rear of another chassis 18, the slot 110 slipping over the coupler pocket lug 114 for coupling action but allowing for pivotal movement between the chassis 18 and 30. Operation of the handle and lock assembly 58 during the coupling operation of the chassis 18 and 30 insures proper and positive locking of the couplers 38 to the coupler pocket members 40 as described below.

A principal object, as stated, of this coupler is to couple together two container chassis in a non-rigid manner. This coupling arrangement can be used when the chassis are empty or when they are loaded with containers. The rear chassis or unit is raised with the landing gear until the hooked portion of the coupler is approximately level with the coupler pocket; the units are brought together; and then the rear unit is lowered with the landing gear and the coupler is locked. The lock assembly is rotatable and axially slidable on the handle assembly for locking and unlocking the coupling arrangement. The handle assembly can pivot around the pin 72 through an arc as indicated by FIGS. 5, 8, 11 and 12, it being understood that the lock assembly 74 must be moved out of the way when the handle assembly 62 is in the position indicated, for instance, by FIG. 12. The stop 94 serves to restrict the forward and upward motion of the handle assembly 62. The handle spring serves to keep the handle assembly 62 pushed forward against the stop 94 at all times except during the coupling and uncoupling operation. The step-wise coupling operation is as follows:

In step 1 the leading trailer with tractor is placed in longitudinal alignment with the following trailer which is supported by a landing gear for coupling of the front and rear chassis units together. The lug 78 of the lock assembly 74 is in a vertical position and spaced outwardly of the coupled 38 and on the handle assembly 62 which is perpendicular to the longitudinal axis of the rear chassis unit and the handle spring keeps the handle assembly pushed forward (see FIG. 5). The next step is to raise the relative position of the rear chassis 30 after the height of the rear chassis unit 30 is adjusted with its landing gear 34, as seen in FIGS. 5 and 6. In the next step the chassis units 18 and 30 are brought together, as by backing the tractor, until the couplers 38 of the rear unit enter into the coupler pockets 40 of the leading unit. The top of the coupler pocket has pushed the handle assembly 62 back against the force of the handle spring 104, as shown by FIGS. 7 and 8. Next, the rear chassis unit 30 is lowered with its landing gear far enough so that the handle spring 104 pushes the handle assembly 62 forward until the latch 64 enters the coupler pocket, as shown by FIG. 9. Next, the lock assembly 74 is pulled out away from behind the coupler 38 against the force of spring 86 and rotated clockwise 90° around the longitudinal axis of the handle assembly 62 into the position indicated by phantom outline in FIG. 11 and then the lock assembly 74 is put in position behind the latch 64. The latch 64 cannot come out of the coupler pocket 40 as long as the lock assembly 74 is in this position, thus the chassis 18 and 30 are coupled in a non-rigid or pivotal connection because the latch has some angular movement in a vertical plane with respect to the top of the corner pocket 40, as seen in FIG. 10. Uncoupling of the chassis 18 from the chassis 30 is accomplished in essentially the reverse order for the coupling of these chassis. The first step of the uncoupling operation is to move the lock assembly 74 from its position behind the latch 64 outwardly by the operator. Then the handle assembly 62 is pulled to the rear against the force of the handle spring 104 which places the lug 78 of the locking assembly 74 between the handle assembly 62 and the coupler pocket 40, which prevents the latch 64 from re-entering the coupler pocket 40, as seen in FIG. 12. The rear chassis unit 30 can then be raised with the landing gear 34, as shown in FIG. 6, and the front unit 18 pulled away.

The foregoing description and drawings are given merely to explain and illustrate the invention and the invention is not to be limited thereto except insofar as the inventive claims are so limited, since those skilled in the art who may have the disclosure before them will be able to make modifications and variations therein without departing from the scope of the invention.

What is claimed is:

1. A chassis coupling arrangement for a pair of tandem semi-trailer chassis comprising, a first coupler means for one chassis, a second coupler means for the other chassis, means for interlocking each coupler means together comprising a handle and lock assembly having a a handle means adapted for pivotal attachment to one chassis, lock means pivotally carried by the handle means and movable relative thereto, between unlocked and locked positions, first coupler locking means on the handle means receivable with one coupler means and further coupler locking means on the lock means receivable with the other coupler means and cooperative therewith for retaining first coupler locking means with the one coupler means for interlocking both coupler means together in the locked position of the lock means, and means for coupling and uncoupling each coupler means to and from one another comprising means for placing the handle and lock assembly in a locked position.

2. A chassis coupling arrangement for a pair of tandem semi-trailer chassis comprising, a first coupler means for one chassis, a second coupler means for the other chassis, means for interlocking each coupler means together comprising a handle and lock assembly having a handle means adapted for pivotal attachment to one chassis and lock means operatively associated with the handle means, first coupler locking means on the handle means receivable with one coupler means and further coupler locking means on the lock means receivable with the other coupler means and cooperative therewith for retaining first coupler locking means with the one coupler means for interlocking both coupler means together, and means for coupling and uncoupling each coupler means to and from one another comprising means for placing the handle and lock assembly in a locked position, and said handle means comprising an elongated handle and said lock means comprising a sleeve element axially and rotatably slidable on the handle means between locked and unlocked positions for concurrent locking of each of the coupler locking means with its respective coupler.

3. A chassis coupling arrangement for a pair of tandem semi-trailer chassis comprising, a first coupler means for one chassis, a second coupler means for the other chassis, means for interlocking each coupler means together comprising a handle and lock assembly having a handle means adapted for pivotal attachment to one chassis and lock means operatively associated with the handle means, first coupler locking means on the handle means receivable with one coupler means and further coupler locking means on the lock means receivable with the other coupler means and cooperative therewith for retaining first coupler locking means with the one coupler means for interlocking both coupler means together, and means for coupling and uncoupling each coupler means to and from one another comprising means for placing the handle and lock assembly in a locked position, and said means for coupling and uncoupling comprising biasing means being adapted for attachment to one of the chassis and engageable with the handle means for urging the same away from the chassis and further biasing means on the handle means for urging the lock means to the locked position between each of the coupler means.

4. A chassis coupling arrangement for a pair of tandem semi-trailer chassis comprising, a first coupler means for one chassis, a second coupler means for the other chassis, means for interlocking each coupler means together comprising a handle and lock assembly having a handle means adapted for pivotal attachment to one chassis and lock means operatively associated with the handle means, first coupler locking means on the handle means receivable with one coupler means and further coupler locking means on the lock means receivable with the other coupler means and cooperative therewith for retaining first coupler locking means with the one coupler means for interlocking both coupler means together, and means for coupling and uncoupling each coupler means to and from one another comprising means for placing the handle and lock assembly in a locked position. and said means for coupling and uncoupling comprising biasing means on the handle means for urging the lock means to the lock position between each of the coupler means.

5. A chassis coupling arrangement for a pair of tandem semi-trailer chassis comprising, a first coupler means for one chassis, a second coupler means for the other chassis, means for interlocking each coupler means together comprising a handle and lock assembly having a handle means adapted for pivotal attachment to one chassis and lock means operatively associated with the handle means, first coupler locking means on the handle means receivable with one coupler means and further coupler locking means on the lock means receivable with the other coupler means and cooperative therewith for retaining first coupler locking means with the one coupler means for interlocking both coupler means together, and means for coupling and uncoupling each coupler means to and from one another comprising means for placing the handle and lock assembly in a locked position, and said means for coupling and uncoupling comprising biasing means being adapted for attachment to one of the chassis and engageable with the handle means for urging the same away from the chassis.

6. A chassis coupling arrangement for a pair of tandem semi-trailer chassis comprising, a coupler means for one chassis, a coupler receiving means for the other chassis, means for interlocking the coupler means and the coupler receiving means comprising a handle and lock assembly having a handle means adapted for pivotal attachment to one chassis and lock means axially and rotatably movable on the handle means, latch means on the handle means receivable with the coupler receiving means and means on the lock means receivable with the coupler means and cooperative therewith for retaining the latch means with the coupler receiving means for interlocking the coupler means and the coupler receiving means, and means for coupling and uncoupling the coupler means and the coupler receiving means comprising biasing means adapted for attachment to one of the chassis for urging handle means to the locked position, and further biasing means on the handle means urging the lock means to a locked position.

7. A chassis coupling apparatus for a pair of tandem semi-trailer chassis having a coupler means for one chassis and a coupler receiving means for the other chassis comprising means for interlocking the coupler means and the coupler receiving means comprising a handle and lock assembly having a handle means adapted for pivotal attachment to one chassis and lock means movable on the handle means, first coupling lock means on the handle means receivable with the coupler receiving means and second coupling lock means on the lock means receivable with the coupler means and cooperative therewith for retaining the first coupling lock means with the coupler receiving means for interlocking the coupler means and the coupler receiving means, and means for coupling and uncoupling the coupler means and the coupler receiving means comprising means adapted for attachment to one of the chassis for placing handle means in a locked position, and further means on the handle means for placing the lock means in the locked position.

8. A chassis coupling arrangement comprising a pair of tandem semi-trailer chassis, first coupler means on one chassis, second coupler means on the other chassis, means for interlocking each coupler means together comprising handle and lock assembly having a handle means movably attached to one chassis and lock means operatively associated with the handle means and movable thereon, first coupler locking means on the handle means receivable with one coupler means and further coupler locking means on the lock means receivable with the other coupler means and cooperative therewith for retaining the first coupler locking means with the one coupler means for interlocking both coupler means together, and means for coupling and uncoupling each coupler means to and from one another comprising means for placing the handle and lock assembly in a locked position.

9. A chassis coupling arrangement for a pair of tandem semi-trailer chassis comprising, first coupler means for one chassis, second coupler means for the other chassis, means for locking each of the coupler means together comprising locking structure adapted for pivotal connection on one of the chassis and lock means pivotally mounted on the locking structure movable therealong, first latch means on the locking structure for locking engagement with one of the coupler means when the locking structure is moved from an unlocked to a locked position and second latch means on the lock means for engagement with the other coupler means when the lock means is moved from a first position to a second position along the locking structure in the locked position of the locking structure, and means for retaining each of the latch means in a locked position.

10. The invention according to claim 1 and said first coupler means comprising a pair of coupler units and said second coupler means comprising a pair of coupler receiving units, and said handle and lock assembly comprising a pair of handle and lock units, each handle and lock unit having respective registering engagement between a respective coupler unit and a respective coupler receiving unit.

References Cited

UNITED STATES PATENTS

| | | | |
|---|---|---|---|
| 3,102,738 | 9/1963 | De Roshia | 280—415 |
| 3,163,306 | 12/1964 | Bennett et al. | 214—515 |
| 3,288,492 | 11/1966 | Stricker et al. | 280—415 |
| 3,294,420 | 12/1966 | Martin | 280—415 |

LEO FRIAGLIA, *Primary Examiner.*